United States Patent [19]

Flinchbaugh

[11] 4,032,162
[45] June 28, 1977

[54] MACHINE TOOL CHUCK

[75] Inventor: James D. Flinchbaugh, York, Pa.

[73] Assignee: Weldon Hydraulics, Inc., York, Pa.

[22] Filed: July 26, 1976

[21] Appl. No.: 708,488

[52] U.S. Cl. ................................................ 279/4
[51] Int. Cl.² ................... B23B 31/19; B23B 31/30
[58] Field of Search ........................................ 279/4

[56] References Cited

UNITED STATES PATENTS

| 2,372,592 | 3/1945 | Lovely | 279/4 |
| 3,396,613 | 3/1946 | Somes | 279/4 X |
| 3,108,819 | 10/1963 | McKay | 279/4 |
| 3,216,294 | 11/1965 | Jennings | 279/4 X |
| 3,814,449 | 6/1974 | Buck | 279/4 X |

FOREIGN PATENTS OR APPLICATIONS

272,775  5/1971  U.S.S.R. ................................. 279/4

Primary Examiner—Leonidas Vlachos
Attorney, Agent, or Firm—Robert B. Frailey

[57] ABSTRACT

A high speed hydraulically actuated rotatable chuck for machine tools, permitting the high pressure clamping of elongated work pieces with capacity to be machined simultaneously at opposite ends. Two separate, axially aligned hollow work holding elements are provided, each having capacity to contract diametrically to work clamping condition, and to expand diametrically to work releasing condition. Annular actuators are mounted externally about the work holding elements, with capacity for axial movement relative thereto. A plurality of hydraulically actuated pistons are provided to advance the annular actuators, under a high, uniformly applied working pressure, to contract their work holding elements into work clamping relation. Quick-acting release means retract the actuators, upon deactivation of the pistons, to permit the work holding elements to expand to work releasing condition. The hydraulic system is designed to transmit high pressure fluid from a stationary source to the high speed rotating chuck with a minimum of fluid leakage.

16 Claims, 11 Drawing Figures

MACHINE TOOL CHUCK

BACKGROUND OF THE INVENTION

The present invention relates to a high speed rotatable chuck for machine tools, which provides extremely high chucking or clamping pressures, permitting simultaneous machining of opposite ends or portions of elongated work, such as bar stock, tubular materials and the like.

Machine tool chucks provided with a hollow work holding element, having capacity to contract diametrically to work clamping condition and to expand diametrically to work releasing condition, are well known. It also is known to provide chucks having tubular work holding elements about which are mounted annular actuators, which may be advanced by a piston or piston-like means, and retracted by opposing releasing means, such as one or more springs. Examples of such chucks are disclosed in U.S. Pat. Nos. 3,072,416, 3,278,193, 3,533,636 and 3,731,942. Such devices, however, do not provide for high speed, high pressure "chuckling" of elongated work stock, permitting the simultaneous machining of such work at opposite ends, or spaced portions thereof.

SUMMARY OF THE INVENTION

The primary object of this invention is to provide a new improved chuck for machine tools, permitting the simultaneous machining of opposite ends, or spaced portions, of elongated work pieces, such as bar stock, tubular materials, and the like.

A further object of the invention is to provide a new and improved high speed, high pressure chuck for machine tools, which permits the same, similar or diverse machining operations to take place simultaneously on identical or different work pieces, on opposite sides of the chuck.

A further object of the invention is to provide a new and improved high speed, hydraulically actuated collect-type chuck having means for transmitting actuating fluid at high pressure from a stationary source to rotating chuck parts with a minimum of fluid leakage.

A further object is to provide such a high pressure, hydraulically actuated chuck which does not require contacting fluid seals which would limit the size, speed or use of the chuck, and would be subject to problems of friction and heat, and to excessive wear and frequent replacement.

A further object is to provide a new and improved chuck for machine tools which permits high pressre clamping of relatively short work pieces having relatively large diameters, with capacity for simultaneously machining the work piece at each end.

To achieve the foregoing objectives, the invention in its preferred form utilizes two separate, axially aligned hollow work holding elements, each having capacity to contract diametrically to work clamping condition and to expand diametrically to work releasing condition, and a pair of annular actuators, each disposed externally of one of the work holding elements in telescopic relation thereto, with capacity for axial movement relative to its work holding element. An annulus of angularly spaced pistons is associated with each actuator, and operative to engage and advance the actuators to contract their work holding elements into work clamping relation. A high pressure hydraulic system is employed to advance the pistons into operative engagement with their annular actuators. Release means, such as a plurality of angularly spaced springs, are utilized to retract the actuators, and restore them to non-operative position, upon deactivation of the high pressure hydraulic system by which the pistons are advanced.

DETAILED DESCRIPTION OF THE INVENTION

Figures 1, 4:
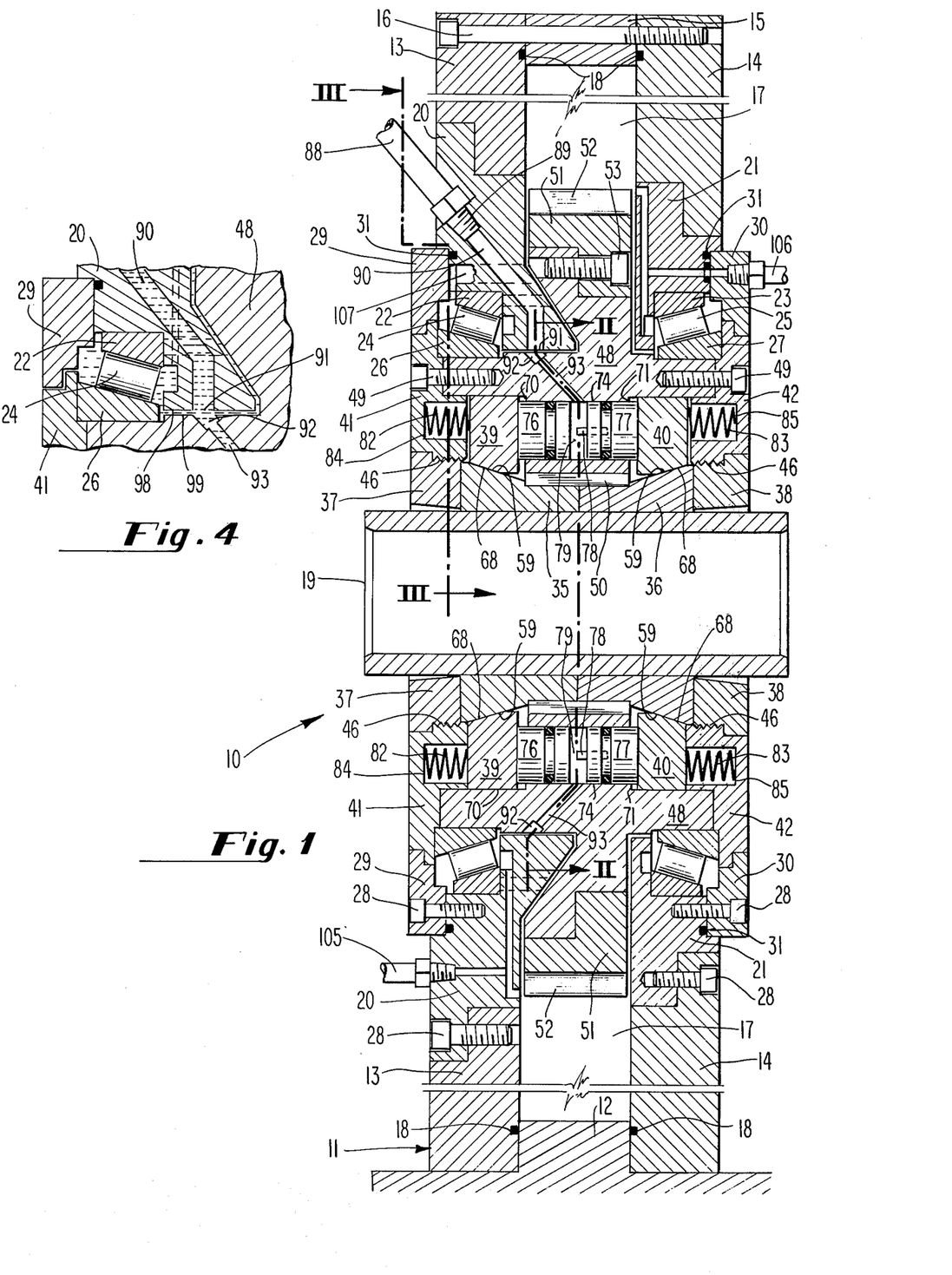
FIG. 1 is a fragmentary longitudinal view in vertical section of a preferred rotatable collet chuck embodying this invention.
FIG. 4 is an enlarged fragmentary view in longitudinal section, illustrating a preferred bearing and lubricating arrangement for the moving parts of the chuck.

Referring to FIG. 1 of the drawing, there is illustrated in vertical section a preferred machine tool chuck assembly 10 embodying this invention. The chuck assembly 10 includes a stationary housing 11 having a base 12, horizontally spaced vertical front and rear walls 13, 14 and a top or cover 15 disposed between, and secured fluid tight to, the upper portions of the walls by threaded bolts 16 or similar elements. The space 17 between the front and rear walls 13, 14 of the housing 11 is closed by means of suitable horizontally spaced side walls (not shown). The closed space 17 is rendered fluid tight by the disposition of suitable sealing means, such as gaskets 18.

In the preferred embodiment illustrated in FIG. 1, the chuck assembly 10 is shown as mounting a tubular work piece 19 for machining.

Figure 3:
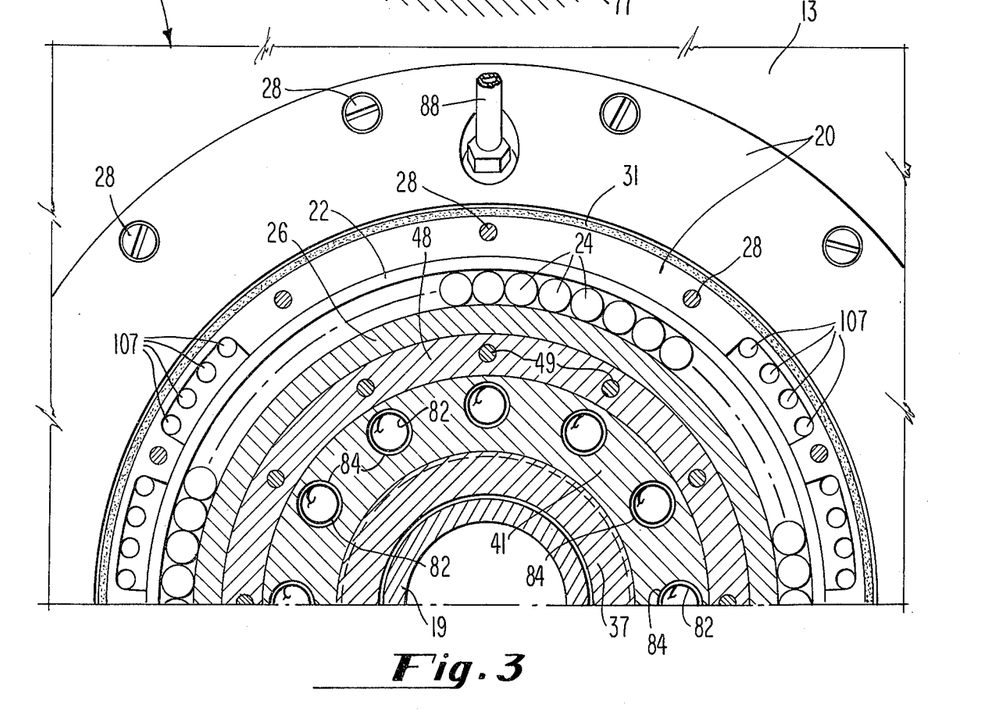
FIG. 3 is an enlarged, transverse fragmentary view, partly in section, indicated by the arrows III—III of FIG. 1.
Figures 5, 6, 7:
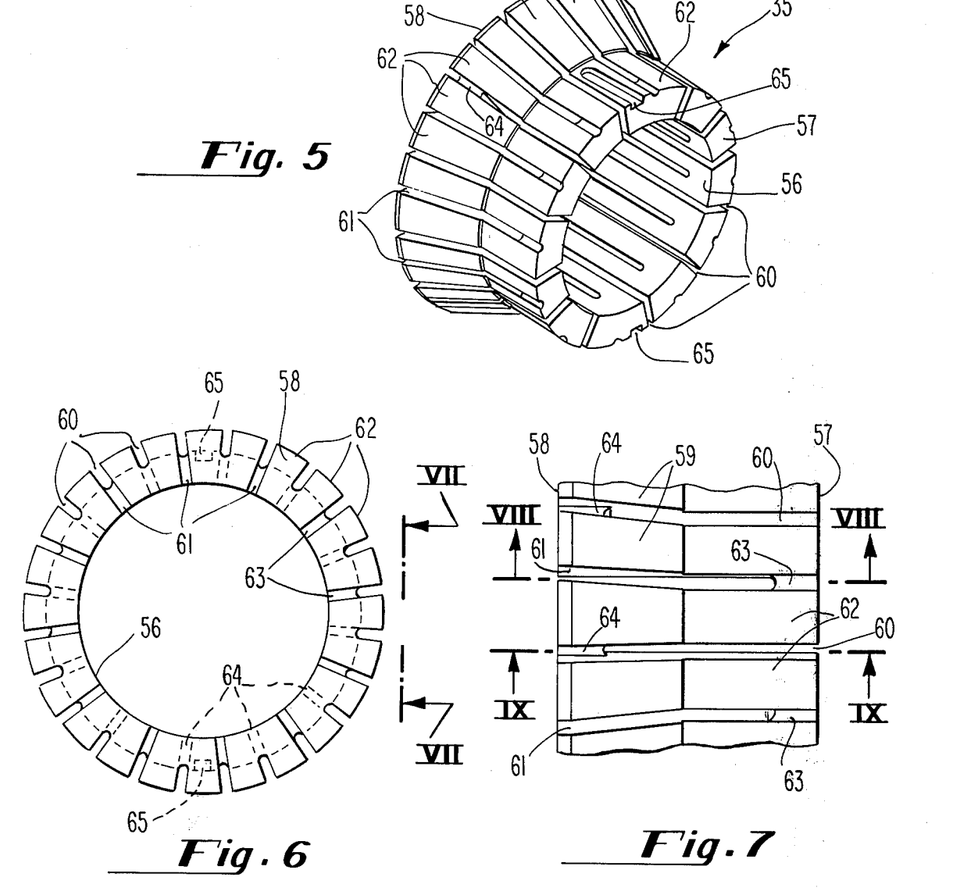
FIG. 5 is an enlarged view in perspective of a preferred form of collet utilized in the chuck.
FIG. 6 is a tranverse view looking in the direction of the enlarged end of the chuck.
FIG. 7 is an enlarged fragmentary view in elevation, indicated by the arrows VII—VII of FIG. 6.
Figure 8:
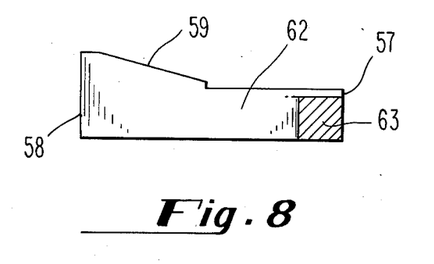
FIG. 8 is a sectional view indicated by the arrows VIII—VIII of FIG. 7.
Figure 9:
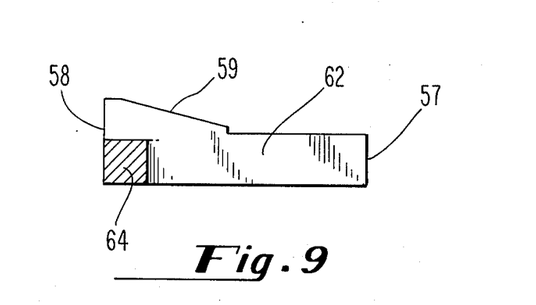
FIG. 9. is a sectional view indicated by the arrows IX—IX of FIG. 7.

The stationary housing 11 of the chuck assembly includes horizontally spaced, generally annularly shaped bearing housings 20 and 21. Stationary bearing housings 20, 21 mount, respectively, the outer annular races 22, 23, for two axially spaced annuli of bearings, such as roller bearings 24, 25 (FIGS. 1, 3). The bearings support rotatably the rotary elements of the chuck assembly. Secured externally to the bearings housing 20, 21 are stationary rings 29, 30, respectively. Suitable seals, such as gaskets 31, render the engagement of rings 29, 30 with their bearing housings 20, 21 fluid tight.

The rotatable elements of the chuck assembly 10 include a pair of separate, axially aligned, tubular work holding elements 35, 36, adapted to be contracted diametrically to clamp the work piece 19, and to be expanded diametrically to release the work piece. A pair of axially spaced annular retainers 37, 38 maintain the two tubular work holding elements 35, 35 in axially aligned relationship. Mounted externally of each work holding element 35, 36, in telescopic relation thereto, is one of a pair of annular, axially spaced actuators 39, 40. Surrounding each of the spaced annular retainers 37, 38 is one of a second pair of annular retainers 41, 42. The outer retainers 41, 42 are engaged threadingly with their respective inner retainers 37, 38 by suitable screw threads 46. The outer annular retainers 41, 42 are located, respectively, externally of the annular actuators 39, 40.

A plurality of holes (not shown) may be provided in the outer faces of the retainers 37, 38 for the reception of a spanner wrench, whereby the retainers 37, 38 may be disengaged from retainers 41, 42 for removal of the work holding elements 35, 36. A hollow rotatable driver 48 is secured to the outer pair of annular retainers 41, 42 by a plurality of bolts 49, and is secured to the work holding elements 35, 36 by means of keys 50, disposed in suitable keyways formed in the work holding elements and the driver 48.

By means of the arrangement shown, the work holding elements 35, 36, annular retainers 37, 38, 41, 42 and driver 48 are rotatable as a unit. Such rotatable unit is driven by a toothed ring gear 51 affixed to the driver 48 by threaded bolts 53. Drive gear 51 is provided with a plurality of peripherally spaced teeth 52 which mesh with a suitable drive gear (not shown) for imparting rotation to the rotatable chuck unit including driver 48, retainers 37, 38, 41, 42 and work holding elements 35, 36. Of course, as will be readily understood, in place of the drive gearing illustrated and described, any equivalent drive means may be employed, such as a sprocket wheel and chain assembly or a pulley and belt assembly.

In the preferred arrangement illustrated in FIG. 1, the two hollow work holding elements 35, 36 comprise split collets of the construction illustrated in FIGS. 5 to 9 inclusive, where element 35 is shown in detail. Element or collet 35 is of generally tubular construction, having an internal bore 56 of uniform diameter. The hollow collet 35 is provided with a relatively thin tubular wall at its inner end 57 and with a relatively thick tubular wall at its outer end 58. Intermediate the inner and outer ends 57, 58, the outer periphery of the collet 35 flares outwardly, in the direction of the outer end 58, to provide a circumferentially extending outwardly tapering surface 59.

The collet 35 is provided with the usual series of alternately arranged slots 60, 61 extending partially axially thereof, and dividing the collet into a plurality of angularly arranged longitudinal segments 62. By reason of such construction, the collet 35 is rendered radially flexible, permitting the collet to contract diametrically to work clamping position and to expand diametrically to work releasing condition. The alternating segments 62 are connected to each other by alternating end portions 63, 64 located, respectively, at the inner end 57 and outer end 58 of the collet. The inner end 57 of the collet is provided with a pair of diametrically spaced keyways 65 (FIG. 5) for the reception of the corresponding diametrically spaced keys 50 (FIG. 1) for securing the collet 35 to the driver 48.

The hollow work holding element 36 is of the same tubular collet construction as the element 35. When mounted in the chuck assembly 10 (FIG. 1), the inner ends of the relatively thin tubular walls of the two work holding elements or collets are disposed in substantially abutting relation. Their relatively thick walled outer ends are disposed adjacent the annular retainers 37, 38 respectively.

Referring back to FIG. 1, it will be observed that the two annular actuators 39, 40 each are provided with internal outwardly tapering annular surfaces 68, which are contiguous with the outwardly tapering peripheral surfaces 59 of the two collets 35, 36. The angular dispositions or inclinations of the circumferential tapered surfaces 59, 68 are substantially identical, so as to provide a mating, slidably engageable relationship between the tapered contiguous surfaces of the collets 35, 36 and their respective actuators 39, 40.

The annular actuators 39, 40 are disposed, respectively, within axially spaced circular recesses 70, 71 formed in driver 48, with capacity for limited axial movement therein. Disposed in the driver 48, intermediate the recesses 70, 71, is an axial bore 72 (FIG. 2) for reception of the pair of abutting collets 35, 36. Also disposed in the driver 48, uniformly spaced radially outward from the axial bore 72, are a plurality of longitudinally extending cylinders 74. As best shown, in FIG. 2, the cylinders 74 are uniformly spaced angularly in the form of an annulus about the axial bore 72. The plural cylinders 74 are disposed intermediate of the recesses 70, 71 and their annular actuators 39, 40.

Slidably disposed in each cylinder 74 is a pair of spaced, co-axial pistons 76, 77. One piston of each co-axial pair of pistons 76, 77 in a common cylinder 74 is provided with a rearwardly extending spacer pin 78. In the arrangement shown in FIG. 1, the spacer means 78 are mounted in the rear ends of the pistons 77. Such arrangement ensures that, at all times, a clearance 79 is maintained in each cylinder 74 between the opposing rear ends of the pistons 76, 77. In order to maintain the pistons 76, 77 fluid tight within their common cylinders 74, each piston may be provided with an annular recess for the reception of a suitable 0-ring or similar seal.

The pistons 76, 77 are operative to be advanced outwardly of their common cylinders 74, whereby the front ends of the pistons engage the annular actuators 39, 40 to advance or displace the actuators axially, relative to their collets 35, 36, toward the retainers 37, 38, respectively. As the pistons 76, 77 advance into contact with the actuators 39, 40, the inner tapered surfaces 68 of the actuators advance slidably over the outer tapered surfaces 59 of the collets, causing the collets to contract to clamp work piece 19. The several pistons of each annulus of pistons are operative to apply uniformly to the actuators 39, 40 a relatively high force, resulting in relatively high clamping pressure being exerted by the contracted collets 35, 36. In their advanced positions, the actuators 39, 40 are rigidly wedged within their respective recesses 70, 71 between the opposing surfaces of the collets 35, 36 and the driver 48. In such position, the actuators rotate as an integral part of the rotatable chuck unit composed of the collets 35, 36, retainers 37, 38, 41, 42, driver 48 and gear 51.

Opposing the advance of the actuators 39, 40 are a plurality of angularly spaced springs 82, 83 disposed within recesses 84, 85 formed, respectively, in the outer retainers 41, 42. The springs 82, 83, and their respective recesses 84, 85, are disposed in the form of an annulus, with the springs maintained in continuous engagement with their respective annular actuators 39, 40. Each actuator 39, 40 is disposed, respectively, intermediate its associated annuli of springs 82, 83 and pistons 76, 77. In the arrangement shown, the springs oppose resiliently the advance of the actuators 39, 40 under the force of their pistons, and are compressed into their recesses as the actuators advance. When the pistons are deactivated, the annuli of springs 82, 83 operate as release means to retract their actuators inwardly relative to their recesses 70, 71, thereby permitting the collets 35, 36 to expand automatically to work releasing condition.

As will be observed, the the chuck assembly 10 illustrated in FIG. 1, the collets 35, 36, retainers 37, 38, 41, 42, actuators 39, 40, driver 48 and the annuli of pistons 76, 77 and springs 82, 83 are all co-axial.

Figure 2:
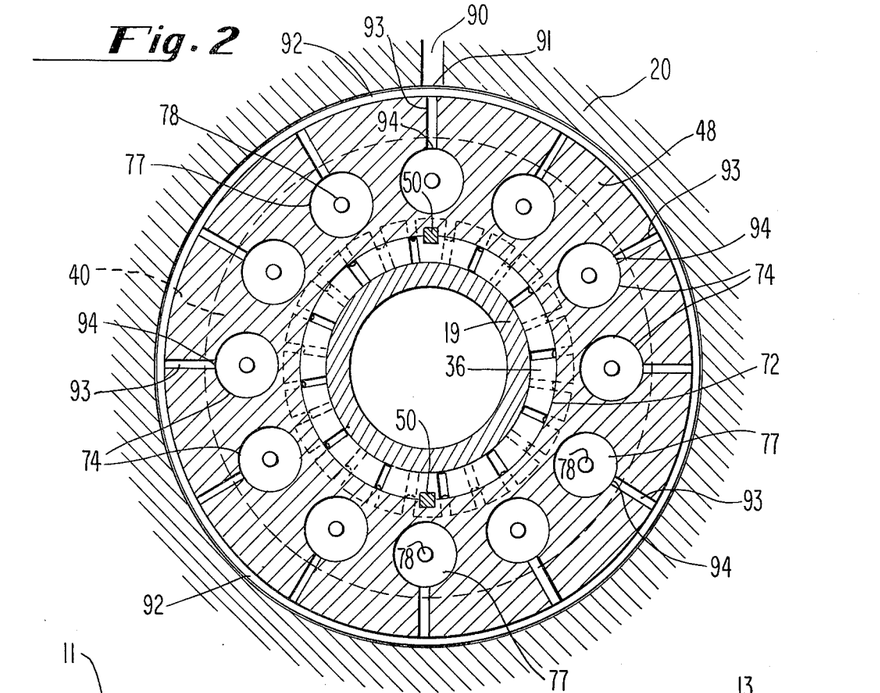
FIG. 2 is a fragmentary transverse view in section, indicated by the arrows II—II of FIG. 1.

The means for actuating the pistons 76, 77, to advance them into engagement with their actuators 39, 40, comprises a high pressure hydraulic system, in which the fluid preferably is a lubricating oil. The hydraulic system includes an external tube 88 leading to, and comprising part of, a high pressure source of fluid (not shown). Tube 88 is engaged threadingly within a tapped hole 89 in the bearing housing 20. An inlet conduit 90 disposed in the housing 20 extends from hole 89 to an annular manifold 92 formed in the rotatable driver 48. The inner end of the conduit 90 is provided with a port 91, which is so located in the housing 20 as to be continuously in communication with the annular manifold 92, during rotation of the driver 48 (FIG. 2).

Extending inward internally of the driver 48, from the manifold 92 to the cylinders 74, are plurality of angularly spaced outlet conduits 93. One each of the conduits 93 extends to one of the cylinders 74. Each outlet conduit 93 communicates with its cylinder 74 via a port 94 (FIG. 2) formed in the wall of the cylinder adjacent to clearance 79 therein, intermediate the spaced co-axial pistons 76, 77. When the high pressure hydraulic system is activated, fluid flows through tube 88, hole 89, inlet conduit 90 and port 91 into the annular manifold 92. From the manifold 92, the high pressure fluid passes through the several spaced outlet conduits 93 and ports 94 into the clearances 79 in the common cylinders 74, to advance the pistons 76, 77 into engagement with their respective actuators 39, 40. When the hydraulic system of the chuck assembly 10 is deactivated, the springs 82, 83, acting as a release means, retract the actuators 39, 40 to their original position in the assembly.

As best shown in FIG. 4, the port 91 and manifold 92 of the hydraulic system communicate proximate the annulus of bearings 24, at a location in the chuck assembly 10 where an inner annular surface 98 of stationary housing 20 engages a complementary outer annular surface 99 of the driver 48. The clearance between the opposing annular surfaces 98, 99 is extremely small, on the order of 0.001. The arrangement permits a controlled flow or leakage of the lubricating oil comprising the fluid of the hydraulic system to pass from port 91 into and between the opposing surfaces of the stationary housing 20 and the rotatable driver 48, as illustrated in FIG. 4. Such arrangement aids in the continuous and automatic lubrication of the opposing areas of bearing housing 20 and driver 48. It also eliminates the use of contacting fluid seals in the hydraulic system, where fluid passes from the stationary components of the chuck assembly 10 to the rotary components thereof. The elimination of fluid seals eliminates problems inherent in their use, resulting from friction and heat due to the high speed of the rotatable chuck parts, creating excessive wear of the seals and requiring their frequent replacement. The controlled flow, or seepage, or leakage of lubricating oil from the hydraulic system into the annulus of bearings 24, of course, aids in their lubrication, also.

Each annulus of bearings 24, 25, may be continuously lubricated, by a lubricating oil identical to that of the chuck hydraulic system, by a flow system of conventional design. Inlet tubes 105, 106 connected to a common source of lubricating oil, such as a sump pump (not shown), deliver oil, via suitable ports and conduits, to the annuli of bearings 24, 25. By means of a suitable discharge ports and conduits, including the plural discharge ports 107 (FIG. 3), lubricating oil delivered via tubes 105, 106, and from port 91, may be continously discharged from the annuli of bearings 24, 25 and permitted to flow to, over and among the various parts of the chuck assembly, eventually to collect in a sump (not shown) in the housing 11.

Of course, in place of the springs 82, 83, any other quick-acting suitable release means may be employed, operative to quickly return the actuators 39, 40 to their inactive location within the chuck assembly 10. For example, the two annuli of springs 82, 83 may be replaced by two annuli of pistons, similar to and disposed in opposition to, the annuli of pistons 76, 77.

Figure 10:
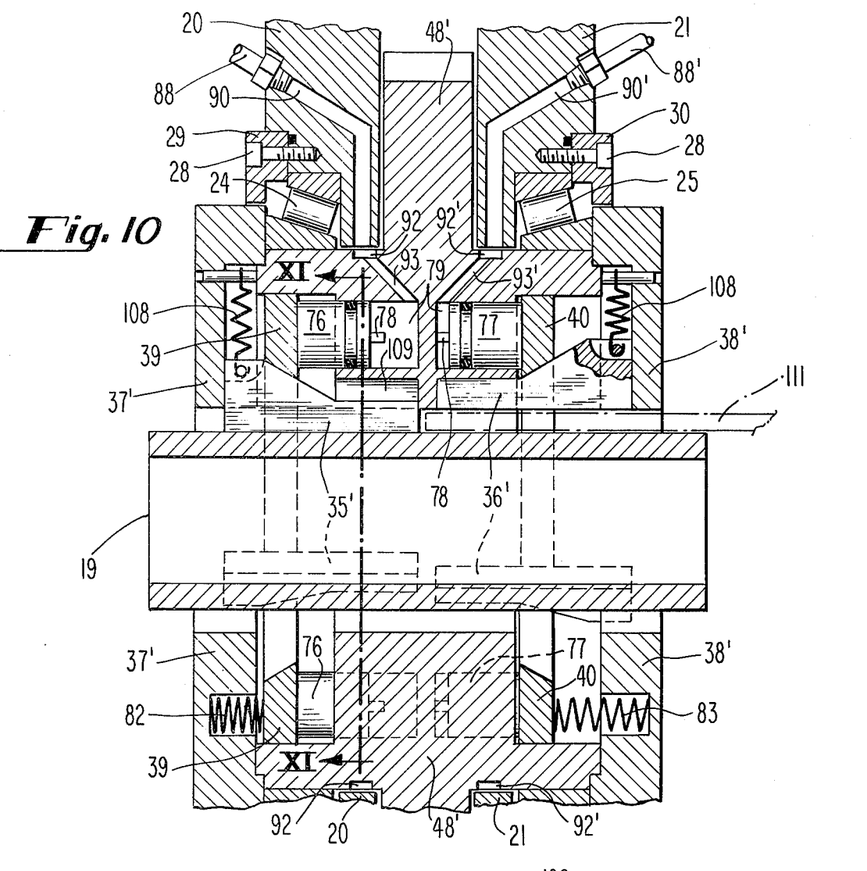
FIG. 10 is a fragmentary longitudinal view in vertical section, illustrating a modification of the invention utilizing two separate hydraulically actuated chucking systems.
Figure 11:
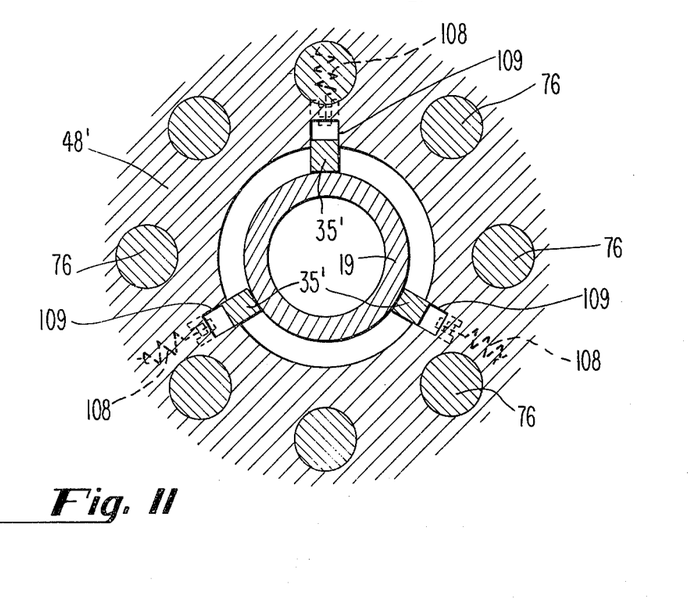
FIG. 11 is a fragmentary transverse view in section indicated by the arrows XI—XI of FIG. 10.

In the modification of the invention illustrated in FIGS. 10 and 11, two separate chucking assemblies, including two separate hydraulic systems, are provided. In such arrangement, the driver 48 and drive gear 51 of FIG. 1 are formed as an integral drive means 48'. The superimposed annular retainers 37, 41 and 38, 42 of FIG. 1 are formed, in the FIGS. 10, 11 embodiment, as integral, axially spaced annular retainers 37', 38'. The tubular work holding elements 35', 36' each assume the form of a plurality of arcuately spaced, axially extending separate segments (FIG. 11). Although three such arcuately or angularly spaced segments are illustrated, it will be understood that the hollow work holding elements 35', 36' may be composed of any suitable number of such individual segments. The pistons 76, 77 are disposed in separate cylinders. Each piston is provided with its own spacer pin 78, to maintain minimum clearance in their cylinders adjacent the rear ends of the pistons.

The pistons 76, 77, under the influence of high pressure fluid from their separate hydraulic systems, are advanced to contact and advance the annular actuators 39, 40, to cause the separate segments of the work holding elements 35', 36' to contract into work clamping condition. The release means for retracting the actuators 39, 40, upon deactivation of the pistons 76, 77, comprise a plurality of radially extending, axially spaced springs 108 spaced angularly about the axis of the chuck assembly (FIG. 11). The inner end of each spring 108 is affixed, by suitable means such as a pin, to the outer end of one of the segments of each of the tubular work holding elements 35', 36'. The outer end of each spring is secured to any suitable means, such as a pin, mounted in one of the axially spaced annular retainers 37', 38'. The individual angularly spaced segments of the work holding elements 35', 36', under the influence of the springs 108, are urged radially outward, into angularly spaced slots 109 formed in driver 48'. As best illustrated in FIG. 11, the slots 109 are in communication with the internal axial bore of the driver 48'.

When the pistons 76, 77 are advanced, to displace the actuators 39, 40, the individual segments of the work holding elements 35', 36' are forced radially inward, against the force of the springs 108, into clamping relationship with the work piece 19. When the pistons 76, 77 are deactivated, springs 108 retract the individual segments of the work holding elements 35', 36' radially outward, relative to the work piece 19, to release the same, at the same time, causing the actuators 39, 40 to retract or slide inwardly relative to the chuck assembly.

The modified chuck assembly of FIGS. 10 and 11 may be provided with the same type of roller bearing annuli 24, 25 as that utilized in the FIG. 1 embodiment. The two separate hydraulic systems are each substantially identical to the system illustrated in FIG. 1. The two hydraulic systems are provided with separate fluid inlet tubes 88, 88' connected to, and comprising part of, a common source (not shown) of high pressure fluid. Each of the hydraulic systems includes holes, inlet conduits, ports, manifolds and plural outlet conduits comparable in structure and function to the hole 89, inlet conduit 90, port 91, manifold 92 and conduits 93 of FIG. 1. The separate outlet conduits 93, 93' extending inwardly from the manifolds 92, 92' are connected to separate cylinders, as shown in FIG. 10, to permit flow of high pressure fluid into the clearances 79 located in the cylinders rearwardly of the pistons 76, 77.

In the modification illustrated in FIGS. 10–11, a single work piece 19 may be clamped by one only of the work holding elements, such as element 35', while the individual segments of the other work holding element 36' are retracted radially to non-clamping position. With such arrangement, it is possible to provide sufficient clearance between the work piece 19 and the retracted work holding element 36' to insert a suitable machine tool 111, shown in phantom in FIG. 10, to machine the work piece 19 internally of the tubular work holding element 36'.

If desired, in the modification of FIGS. 10 and 11 axially disposed springs 82, 83 may also be utilized, in addition to the radial springs 108, to act as quick releasing means to retract the segments of the work holding elements 35', 36' upon deactivation of the pistons 76, 77.

With this invention, it is possible to employ over sustained periods of use, high pressure chucking forces and high speeds of chuck rotation, while permitting simultaneous machining of work on opposite sides of the chuck assembly. By eliminating contacting fluid seals, and permitting controlled leakage of lubricating oil used as the fluid in the hydraulic system, problems arising from fluid leakage, occurring during machining operations over sustained periods of time, are substantially eliminated. The elimination of frequent shut downs, to replace worn and leaking fluid seals, is avoided.

By reason of the chuck of this invention, it is possible to mount work pieces successively for machining, and remove them after machining, without stopping rotation of the rotatable chuck elements. And because of the high chucking pressures rendered possible by the invention, high cutting forces applied by suitable machine cutting tools may be employed over sustained periods of time. The invention permits high pressure clamping of relatively short work pieces having relative large diameters, with capacity for simultaneously machining the work piece at each end, either by the same, or similar, or diverse machining operations.

In order to permit the machining of work pieces of different diameters, the invention contemplates the use of hollow work holding elements having internal diameters of various sizes. For example, in the FIG. 1 embodiment tubular collets 35, 36 may be utilized having internal bores 56 of different diameters. Where collets 35, 36 of differing sizes are utilized, it is preferred that the spaced annular retainers 37, 38, threadingly engaged with the retainers 41, 42, be of a corresponding annular size. By providing work holding elements 35, 36 and retainers 37, 38 of variable internal diametrical sizes, a highly versatile machine tool chuck is provided, permitting the machining of parts of widely differing diameters.

The springs 82, 83, 108 may be coventional coil type springs, as illustrated. But as will be readily understood, it is within the contemplation of this invention to use equivalent release means, such as hydraulically or pneumatically actuated springs, or other parts having a resilient character.

Although preferred embodiments of this invention have been shown described herein for the purpose of illustration, as required by Title 35 U.S.C. Sec. 112 it is to be understood that various changes and modifications may be made therein without departing from the spirit and utility of this invention, or the scope thereof as set forth in the appended claims.

I claim:
1. A chuck for machine tools for holding two work pieces, including
   a. two separate, axially aligned hollow work holding elements, each element having capacity to contract diametrically to work clamping condition and to expand diametrically to work releasing condition,
   b. a pair of annular, axially spaced actuators, each actuator being disposed externally of one of the work holding elements in telescopic relation thereto, and each actuator having capacity for axial movement relative to its work holding element,
   c. two axially spaced annuli of pistons, each annulus comprising a plurality of angularly spaced pistons disposed adjacent to one of the actuators,
   d. an annulus angularly spaced cylinders for containing the pistons, located intermediate the actuators,
   e. actuating means for advancing the pistons of each annulus of pistons into engagement with their adjacent actuator, to advance the actuator to contract its work holding element, and
   f. release means associated with the actuators and operative to retract the actuators to permit the work holding elements to expand to work releasing condition.

2. The chuck of claim 1, wherein
   a. the two annuli of pistons are spaced axially from each other,
   b. the annulus of cylinders containing the pistons comprise two separate groups of cylinders, each group composed of a plurality of angularly spaced cylinders arranged in the form of an annulus, the two annuli of cylinders being spaced axially from each other, and
   c. the actuating means for advancing the pistons comprises two separate high pressure hydraulic systems, each said hydraulic system being associated with one of the annuli of cylinders,
d. each high pressure hydraulic system including
  i. an annular manifold spaced radially from and extending circumferentially around its annulus of cylinders,
  ii. an inlet conduit connecting the manifold to a source of fluid and
  iii. a plurality of angularly spaced conduits each extending from the manifold to one of the cylinders of the annulus of cylinders,
  iv. each of the plurality of conduits communicating with its cylinder by a port located in the wall of the cylinder.

3. A chuck for machine tools for holding at least one work piece, including
  a. two separate, axially aligned hollow work holding elements, each element having capacity to contract diametrically to work clamping condition and to expand diametrically to work releasing condition,
  b. a pair of annular, axially spaced actuators, each actuator being disposed externally of one of the work holding elements in telescopic relation thereto, and each actuator having capacity for axial movement relative to its work holding element,
  c. two axially spaced annuli of pistons, each annulus comprising a plurality of angularly spaced pistons disposed adjacent to one of the actuators, each piston of each annulus of pistons being co-axial with one of the pistons of the other annulus of pistons, to provide plural pairs of co-axial pistons,
  d. an annulus of angularly spaced cylinders, each cylinder retaining slidably one pair of co-axial pistons,
  e. spacer means associated with at least one piston of each pair of co-axial pistons, to maintain a clearance in their common cylinder between opposing ends of the pistons,
  f. actuating means for advancing the pistons of each annulus of pistons into engagement with the adjacent actuator, to advance the actuator to contract its work holding element, and
  g. resilient means associated with the actuators and operative to retract the actuators to permit the work holding elements to expand to work releasing condition.

4. The chuck of claim 3, wherein the work holding elements, actuators and annuli of pistons are rotatable as a unit, and further including rotatable drive means for imparting rotation to said rotatable unit, said drive means including
  a. securing means for connecting the drive means to the rotatable unit to impart rotation thereto,
  b. a pair of axially spaced circular recesses, each said recess being adapted to receive one of the annular actuators, and each said recess providing for limited axial movement therein of its actuator, and
  c. the annular of angularly spaced cylinders for mounting slidably the pistons of each annulus of pistons, said cylinders being disposed intermediate of the pair of circular recesses.

5. The chuck of claim 3, wherein
  a. the two axially aligned work holding elements are of generally tubular disposition, each having relatively thin inner ends disposed in substantially abutting relation, and each having relatively think outer ends, each outer end being disposed adjacent one of the annular retainers,
  b. a peripherally extending outwardly tapering surface is disposed externally of each work holding element, each said tapered peripheral surface being spaced axially from the inner end of its work holding element, and
  c. each annular actuator is provided with an internal outwardly tapering annular surface, the tapered internal surface of each actuator being contiguous with the tapered peripheral surface of its work holding element,
  d. the angular dispositions of the tapered surfaces of the work holding elements and of the actuators being substantially identical, to provide a slidably engageable relationship between the tapered surface of each work piece and the tapered interior of its telescopically disposed actuator.

6. The chuck of claim 5, wherein
  a. the pistons are operative to advance the actuators relative to their work pieces, whereby the internal tapered surfaces of the actuators slide relative to the outer tapered surfaces of the work holding elements, to contract said elements into work holding position, and
  b. the resilient means comprises angularly spaced springs opposing the advance of the actuators.

7. The chuck of claim 6, wherein
  a. the angularly spaced springs comprise two separate groups of springs, each group being composed of plurality of angularly spaced springs arranged in the form of an annulus,
  b. each annulus of springs being disposed adjacent to one of the annular actuators,
  c. the annuli of springs and pistons associated with each actuator being disposed in opposing relation on opposite sides of their actuators, and
  d. each spring of each annulus of springs is co-axial with one of the pistons of its associated annulus of pistons.

8. The chuck of claim 6, wherein
  a. the angularly spaced springs are disposed radially relative to the annular actuators,
  b. said radially extending springs having inner ends secured to the work holding elements and outer ends affixed at locations remote from the work holding elements.

9. The chuck of claim 3, wherein
  a. the hollow work holding elements, annular actuators and annuli of pistons are all co-axial and
  b. the actuating means for advancing the pistons into engagement with the adjacent actuator comprises a high pressure hydraulic system having a source of fluid and conduit means connecting the source of fluid to each of the cylinders.

10. The chuck of claim 9, wherein
  a. the pistons are provided with front ends adapted to engage their actuators and with rear ends adapted to be contacted by high pressure fluid introduced into the piston cylinders and
  b. the conduit means of the hydraulic system communicates with each of the cylinders by ports formed in the walls of the cylinders rearwardly of the pistons proximate the clearances provided in the cylinders by the piston spacer means.

11. The chuck of claim 9, wherein the high pressure hydraulic system includes
  a. an annular manifold spaced radially from and extending circumferentially around the annulus of cylinders, b. an inlet conduit connecting the manifold to the source of fluid and c. a plurality of angularly spaced conduits each extending from the manifold to one of the cylinders, d. each of the plurality of conduits communicating with its cylinder by a port formed in the wall of the cylinder 12. The chuck of claim 11, wherein the work holding elements, actuators and annuli of pistons and cylinders are rotatable as a unit and the hydraulic system fluid is a lubricating oil, and further including rotatable drive means for imparting rotation to said rotatable unit and an annulus of bearings supporting rotatably the drive means, in which a. the annular manifold, the plurality of angularly spaced conduits and the cylinders are located within the drive means and rotate therewith, b. the inlet conduit connecting the manifold to the source of fluid is stationary, c. the annular manifold is disposed proximate the annulus of bearings and d. conduit means permits controlled flow of fluid from the annular manifold to the annulus of bearings.

13. The chuck of claim 12, further including means for permitting controlled discharge of the fluid from the annulus of bearings.

14. The chuck of claim 12, wherein the work holding elements, retainers, actuators, annuli of pistons and cylinders and the drive means are rotatable as a unit, and further including a. a stationary housing for supporting rotatably said rotatable unit, said housing having the stationary fluid inlet conduit disposed therein, b. a pair of spaced annuli of bearings interposed between the stationary housing and the rotatable unit, c. a sump located internally of the housing for collection of the fluid, d. conduit means disposed between the stationary housing and the rotatable unit, permitting controlled flow of fluid to at least one annulus of bearings, and e. discharge means associated with the annuli of bearings to discharge fluid from the bearings to the sump.

15. A chuck for machine tools for holding at least one work piece, including a. two separate, axially aligned hollow work holding elements, each element having capacity to contract diametrically to work clamping condition and to expand diametrically to work releasing condition, b. a pair of annular actuators, each actuator being mounted externally of one of the work holding elements, and each actuator having capacity for axial movement relative to its work holding element, c. two axially spaced annuli of plural, angularly spaced hydraulically actuated pistons, each annulus of pistons being operative to advance an actuator to contract its work holding element into work clamping relation, d. an annulus of plural, angularly spaced cylinders for the pistons, said annulus of cylinders being disposed intermediate of the two actuators, e. release means associated with the actuators and operative, upon deactivation of the hydraulically actuated pistons, to retract the actuators to permit the work holding elements to expand to work releasing condition, f. the hollow work holding elements, annular actuators and annuli of pistons and cylinders all being co-axial and rotatable as a chuck unit and g. rotatable drive means affixed to said rotatable chuck unit for imparting rotary motion thereto.

16. The chuck of claim 15, wherein the drive means includes a. an axial bore for reception of the hollow work holding elements, b. spaced recesses for retaining the actuators and c. the annulus of cylinders disposed intermediate the actuator recesses, each said cylinder having an open end adjacent one of the recesses.

* * * * *

UNITED STATES PATENT OFFICE
CERTIFICATE OF CORRECTION

Patent No. 4,032,162           Dated June 28, 1977

Inventor(s) James D. Flinchbaugh

It is certified that error appears in the above-identified patent and that said Letters Patent are hereby corrected as shown below:

| | |
|---|---|
| Column 1, line 24 | change "chuckling" to --chucking-- |
| Column 1, line 52 | change "pressre" to --pressure-- |
| Column 2, line 61 | change "bearingshousing" to --bearing housings-- |
| Column 3, line 4 | change "35", second occurrence, to --36-- |
| Column 5, line 13 | change "the", first occurrence, to --in-- |
| Column 5, line 33 | before "plurality" insert --a-- |
| Column 5, line 58 | change "0.001" to --0.001"-- |
| Column 6, line 15 | delete "a" |
| Column 7, line 6 | change the _period_ to a _comma_ |
| Column 8, line 48 | after "annulus" insert --of-- |

UNITED STATES PATENT OFFICE
CERTIFICATE OF CORRECTION

Patent No. 4,032,162      Dated June 28, 1977

Inventor(s) James D. Flinchbaugh

It is certified that error appears in the above-identified patent and that said Letters Patent are hereby corrected as shown below:

Column 9, line 58    change "annular" to --annulus--

Column 9, line 66    change "think" to --thick--

Column 10, line 28   after "of" insert --a--

*Signed and Sealed this*

*Thirteenth* Day of *September 1977*

[SEAL]

Attest:

RUTH C. MASON      LUTRELLE F. PARKER
*Attesting Officer*      *Acting Commissioner of Patents and Trademarks*